(12) United States Patent
Gassel et al.

(10) Patent No.: US 8,754,931 B2
(45) Date of Patent: Jun. 17, 2014

(54) VIDEO EYEWEAR FOR SMART PHONE GAMES

(75) Inventors: John Gassel, Mansfield, MA (US); Christopher Parkinson, Richland, WA (US); Hong Choi, Sharon, MA (US)

(73) Assignee: Kopin Corporation, Westborough, MA (US)

( * ) Notice: Subject to any disclaimer, the term of this patent is extended or adjusted under 35 U.S.C. 154(b) by 236 days.

(21) Appl. No.: 12/987,275

(22) Filed: Jan. 10, 2011

(65) Prior Publication Data

US 2011/0169928 A1    Jul. 14, 2011

Related U.S. Application Data

(60) Provisional application No. 61/293,506, filed on Jan. 8, 2010.

(51) Int. Cl.
*H04N 9/47* (2006.01)

(52) U.S. Cl.
USPC ............................................................ 348/53

(58) Field of Classification Search
CPC ............ H04N 13/044; H04N 13/0497; H04N 13/0059; G02B 27/017; G02B 27/0172
See application file for complete search history.

(56) References Cited

U.S. PATENT DOCUMENTS

| | | |
|---|---|---|
| 5,075,776 A | 12/1991 | Cheung |
| 5,523,886 A | 6/1996 | Johnson-Williams et al. |
| 5,612,708 A | 3/1997 | Ansley et al. |
| 5,751,341 A | 5/1998 | Chaleki et al. |
| 5,808,591 A | 9/1998 | Mantani |
| 6,268,880 B1 | 7/2001 | Uomori et al. |
| 6,437,767 B1 | 8/2002 | Cairns et al. |
| 6,518,939 B1 | 2/2003 | Kikuchi |
| 6,636,185 B1 | 10/2003 | Spitzer et al. |
| 6,853,935 B2 | 2/2005 | Satoh et al. |
| 7,844,001 B2 | 11/2010 | Routhier et al. |
| 8,253,760 B2 | 8/2012 | Sako et al. |

(Continued)

OTHER PUBLICATIONS

International Preliminary Report on Patentability from PCT/US2011/000035 dated Jul. 19, 2012.

(Continued)

*Primary Examiner* — Dave Czekaj
*Assistant Examiner* — Nam Pham
(74) *Attorney, Agent, or Firm* — Hamilton, Brook, Smith & Reynolds, P.C.

(57) ABSTRACT

Connections, software programming and interaction between a smart phone and a Head Mounted Display (HMD) or other video eyewear to improve user experience. The signal from an accelerometer and/or a touch screen in a smart phone is used only for certain control of an application program, such as to steer a racing car or a plane or to move a game persona character within a virtual space. The main scene for the game is displayed in the HMD and not the smart phone screen. One or more inputs from the HMD such as a head tracker or camera, are connected to the smart phone either via a wire or wirelessly such as via WiFi or Bluetooth. The head tracking and/or camera inputs are used as another input to the game, such as to pan/zoom or change the viewpoint of the user. In a still further implementation, the HMD also can have an integrated processor to make it a "smart" HMD. The game can take advantage of the processing power in such a smart HMD, to implement functions such as side-by-side video processing to provide 3D video to the user.

11 Claims, 11 Drawing Sheets

(56) References Cited

U.S. PATENT DOCUMENTS

| | | |
|---|---|---|
| 2001/0043266 A1 | 11/2001 | Robinson et al. |
| 2006/0241792 A1* | 10/2006 | Pretlove et al. ................ 700/83 |
| 2006/0256140 A1* | 11/2006 | Turner ......................... 345/690 |
| 2007/0247477 A1 | 10/2007 | Lowry et al. |
| 2008/0062143 A1* | 3/2008 | Shahoian et al. ............ 345/173 |
| 2008/0122736 A1 | 5/2008 | Ronzani et al. |
| 2008/0152072 A1 | 6/2008 | Herrmann et al. |
| 2008/0247128 A1 | 10/2008 | Khoo |
| 2008/0259096 A1 | 10/2008 | Huston |
| 2009/0185030 A1 | 7/2009 | McDowall et al. |
| 2009/0219382 A1 | 9/2009 | Routhier et al. |
| 2009/0251457 A1 | 10/2009 | Walker et al. |
| 2009/0251531 A1 | 10/2009 | Marshall et al. |
| 2010/0079356 A1* | 4/2010 | Hoellwarth ....................... 345/8 |
| 2010/0157029 A1 | 6/2010 | MacNaughton et al. |
| 2010/0199232 A1 | 8/2010 | Mistry et al. |
| 2010/0271462 A1 | 10/2010 | Gutierrez Novelo |
| 2010/0309291 A1 | 12/2010 | Martinez et al. |
| 2011/0012845 A1* | 1/2011 | Rothkopf et al. ............ 345/173 |
| 2011/0169928 A1 | 7/2011 | Gassel et al. |
| 2011/0181707 A1 | 7/2011 | Herrmann |
| 2011/0187821 A1 | 8/2011 | Routhier et al. |
| 2011/0187840 A1 | 8/2011 | Chao et al. |
| 2011/0292169 A1 | 12/2011 | Jain |
| 2011/0292170 A1 | 12/2011 | Jain |
| 2012/0176411 A1 | 7/2012 | Huston |

OTHER PUBLICATIONS

Notification of Transmittal of the International Search Report and the Written Opinion of the International Searching Authority, or the Declaration, Mar. 15, 2011, Application No. PCT/US11/00035.

* cited by examiner

Figure 2 (image frames duplicated)

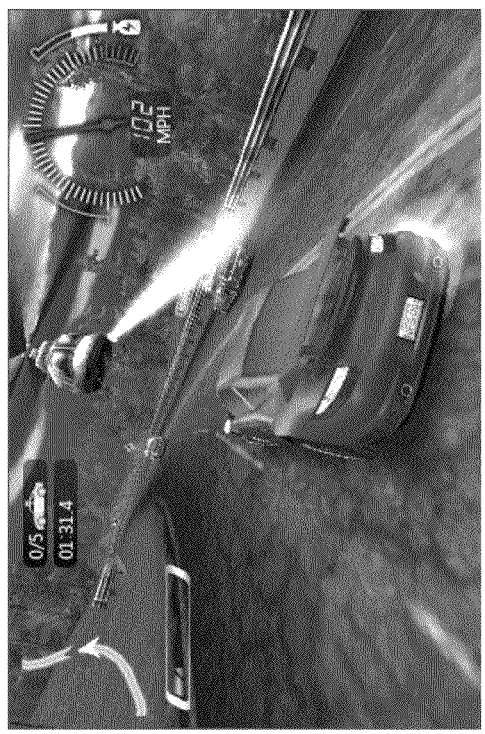
Figure 9

US 8,754,931 B2

VIDEO EYEWEAR FOR SMART PHONE GAMES

RELATED APPLICATION(S)

This application claims the benefit of U.S. Provisional Application No. 61/293,506, filed on Jan. 8, 2010. The entire teachings of the above application are incorporated herein by reference.

TECHNICAL FIELD

The present disclosure relates to the use of a head-mounted display (HMD) or other types of video eyewear together with a smart phone for interactive games.

BACKGROUND AND DESCRIPTION OF PRIOR ART

Smart phones are becoming ubiquitous. The well known iPhone™, sold by Apple Inc. of Cupertino Calif. ("Apple"), has especially changed the paradigm of how smart phones are used. Now the smart phone is much more than a telephone—it has become an extra-portable computer/web browser and game player. Many applications have been written to support smart phones. As of October 2010, Apples' App Store had more than 300,000 applications available and the list continues to grow rapidly.

The game application is the most dominant application category, with more than 70% of all the available applications for the iPhone. Some of these games utilize the built-in accelerometer in the iPhone, which provides an additional way to provide input to a game. However, there are issues with the quality of game play on smart phones as compared to game play on other platforms. The display size is small, moving the smart phone to use the accelerometer changes the screen viewing position, and smart phone display technology does not support 3-dimensional (3D) viewing on the device's screen.

Head-mounted displays (HMD) and other types of video eyewear provide the experience of a large picture in a small form factor. Most smart phones allow their video signal to be routed to an external high-quality digital output port that in turn is designed to connect to an external video device such as a high definition (HD) television. The HMD can take this high-quality video as its primary input and direct it to a binocular display. In the usual and simplest configuration, the same output video generated for the smart phone screen is displayed identically on both the left- and right-eye screens of the binocular HMD. This arrangement provides a 2-dimensional video experience to the wearer of the HMD.

With the wider availability of 3-dimensional (3D) televisions and movies, 3D games are becoming a natural extension of 2-dimensional (2D) games. HMDs are also ideal for providing 3D pictures and images to a viewer because they can show a slightly different image to each eye to provide depth perception. The combination of an HMD and smart phone can provide a very appealing 3D game experience. However, games developed to date for smart phones are not designed to take advantage of the features offered by HMDs or other video eyewear.

SUMMARY OF PREFERRED EMBODIMENTS

The following improvements to the connections, arrangement, software programming and interaction between a smart phone and an HMD can make game applications more enjoyable by taking full advantage of the features that HMDs or other video eyewear offer.

1. In a first implementation, the signal from an accelerometer and/or a touch screen in a smart phone is used only for certain control of the game, such as to steer a racing car or a plane or to move a game persona character within a virtual space. The main scene for the game is displayed in the HMD or video eyewear connected to the smart phone.
2. In a further implementation, one or more inputs from the HMD/eyewear such as a head tracker or camera, are connected to the smart phone either via a wire or wirelessly such as via WiFi or Bluetooth. The head tracking and/or camera inputs are used as an input to the game, such as to pan/zoom or change the viewpoint of the user.
3. In a still further implementation, the HMD also can have an integrated processor to make it a "smart" HMD. The game can take advantage of the processing power in the smart HMD, to implement functions such as side-by-side video processing to provide 3D video to the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 9 is a screen shot of a "Need for Speed"™ game.

DETAILED DESCRIPTION OF PREFERRED EMBODIMENTS

Figure 1:
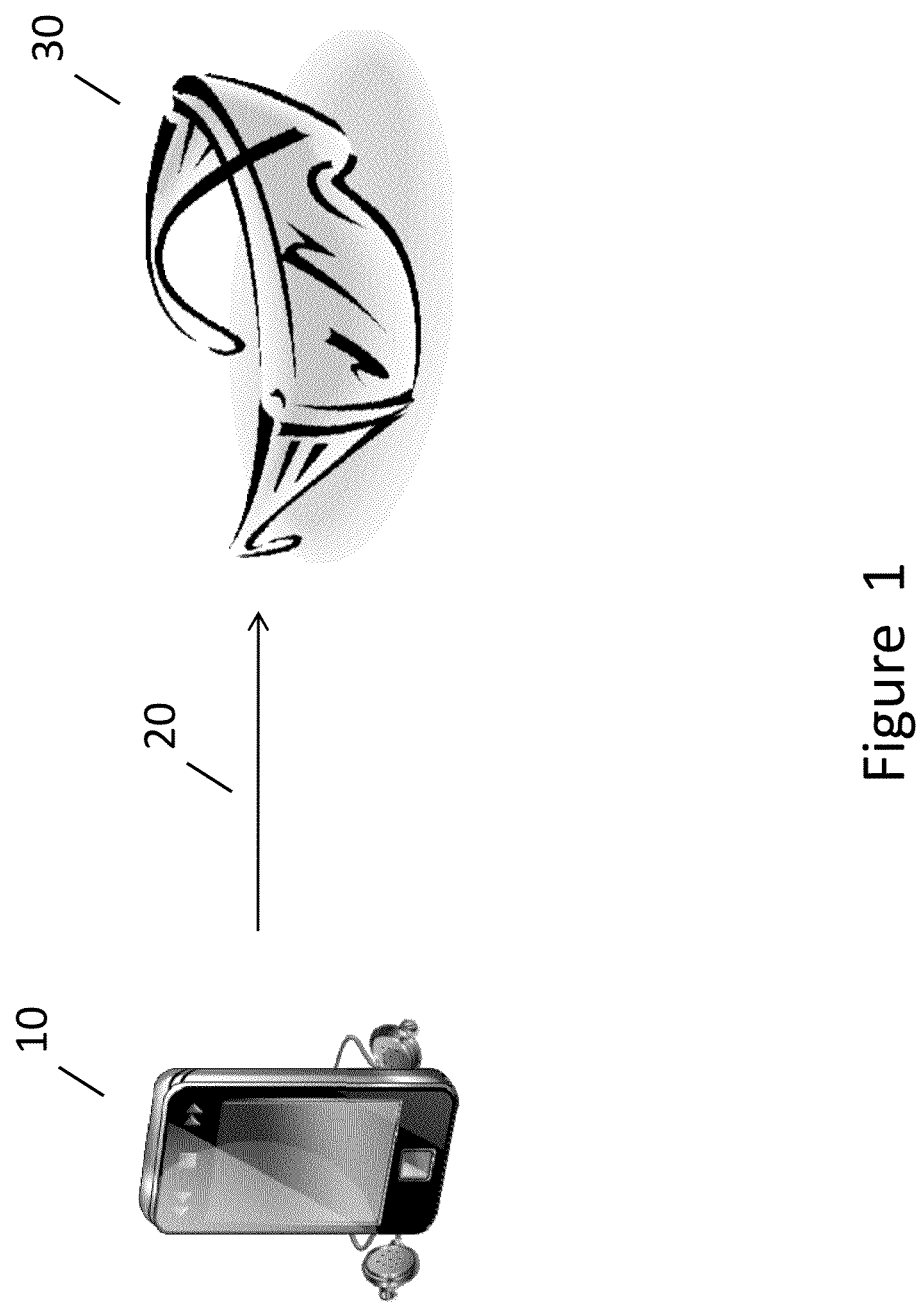
FIG. 1 shows how a video output signal from a smart phone can provide the input to an HMD or video eyewear unit.

A description of example embodiments follows. While the invention as recited in the claims presented elsewhere in this document may be susceptible to these example embodiments in different forms, there is shown in the drawings, and will be described herein in detail, one or more specific embodiments with the understanding that the present disclosure is to be considered but one exemplification of the principles of the invention. There is no intent to limit the invention to only that as illustrated and described herein. Therefore, any references to "the present invention" and "the disclosure" throughout this document are to be interpreted only as a reference to one particular, non-limiting example embodiment of but one aspect of the many inventions described and disclosed and claimed in this document.

This disclosure describes an apparatus and methods(s) for using a Head Mounted Display (HMD) or other video eyewear with a smart phone in a particular way. Turning attention to FIG. 1, there is shown a typical smart phone 10. Most smart phones 10 such as the Apple iPhone, Google Android, RIM Blackberry, or other similar devices may be thought of as a handheld computer integrated within a mobile telephone, and able to run applications based on platforms such as Java or other programming/operating system platforms, with a smart phone usually allowing the user to install and run more advanced applications. In the example shown in FIG. 1, the smart phone 10 is connected to an HMD 30 via a wireless connection 20 such as a Bluetooth or WiFi connection.

Figure 2:
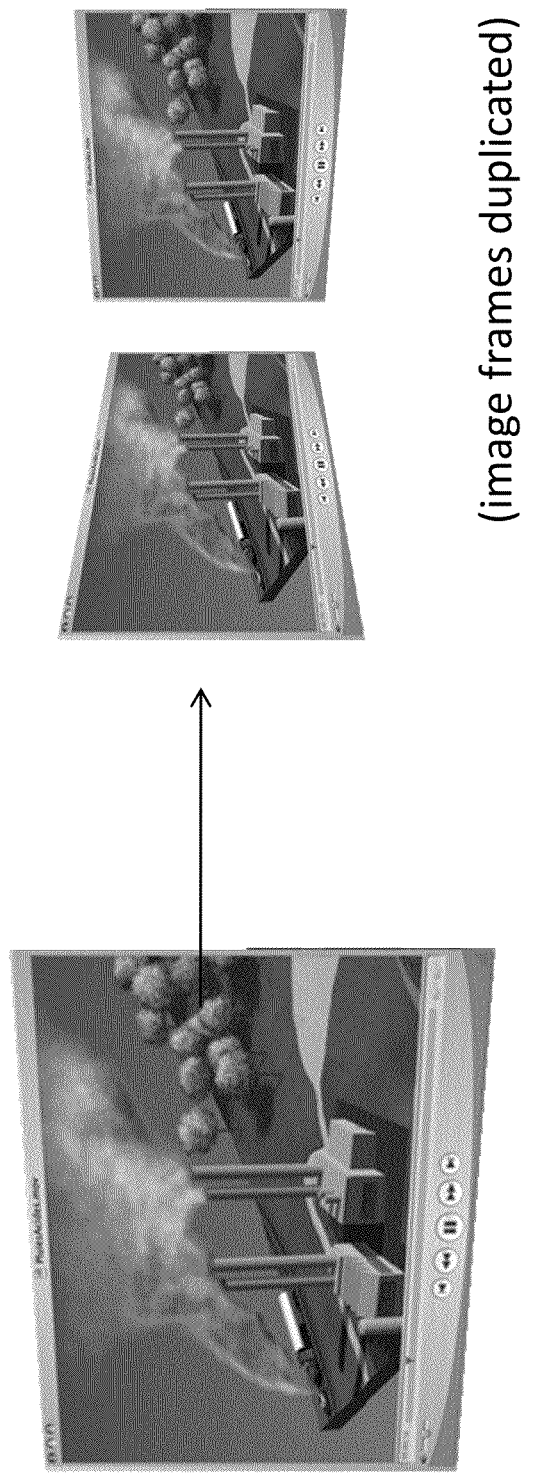
FIG. 2 is a 2-dimensional (2D) implementation of the images to HMD from a smart phone.

Smart phones 10 typically have an output port to provide a high-quality video signal to connect to an external display, such as a high-definition (HD) television. The HMD 30 can take this high-quality video as the primary input to drive binocular displays as shown in FIG. 2. In this arrangement, the output video is displayed identically on both the left and right-hand screens of the binocular HMD 30, and the wearer of the HMD 30 thus perceives the smart phone output as a 2D image stream.

One way to enable 3D content to be displayed on the HMD 30 is to have the smart phone output a 2D video format that encapsulates 3D information in a way that is transparent to the smart phone device 10. Once such example is called a side-by-side video technique, where each frame of video actually contains two separate frames, one for left eye and one for right eye. This video is easy to prepare on the smart phone device 10, but then must be processed accordingly on the HMD 30 side. This can be accomplished with use of and/or modifications to video device drivers and/or operating system kernels for the smart phone.

Figure 3:
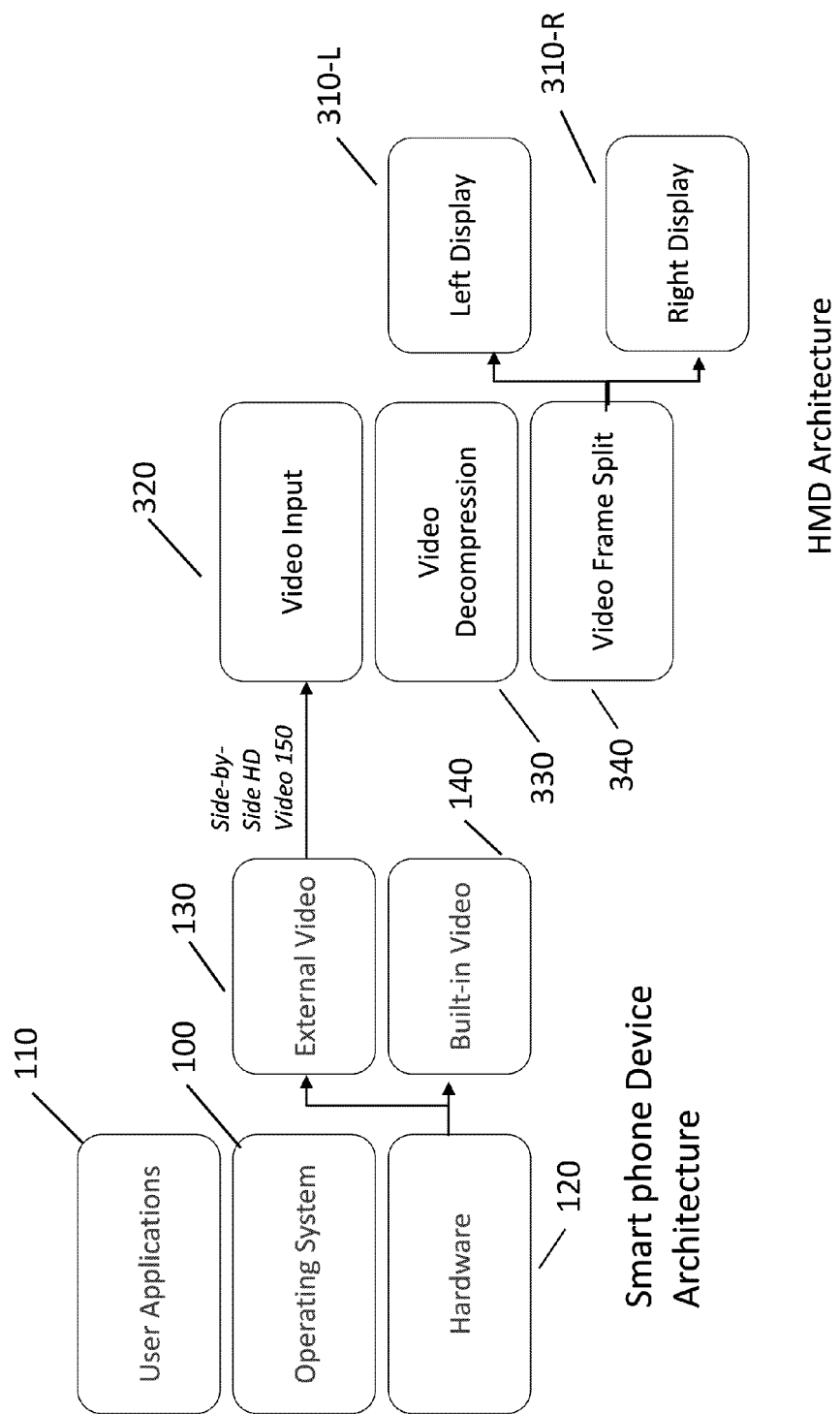
FIG. 3 is a 3-dimensional (3D) implementation of the image to HMD with side-by-side video format.

FIG. 3 is a high level diagram of the video processing architecture in a typical smart phone 10 and in a typical HMD 30. The smart phone 10 has hardware which runs operating system software 100, which in turn executes user application software 110.

The hardware 120 includes built-in video driver circuits 130 and external video driver 140 circuits. In a specific implementation used herein, the external video provides output in the side-by-side HD format.

As one example, 3D side-by-side 480p is now becoming a popular video format for presenting 3D content. This content encodes a left and right frame of video into each single, double width video frame. If this video type is displayed on a standard video output device, it will look like the screen is split into two, with the left screen showing and almost identical version of the right screen.

Figure 4:
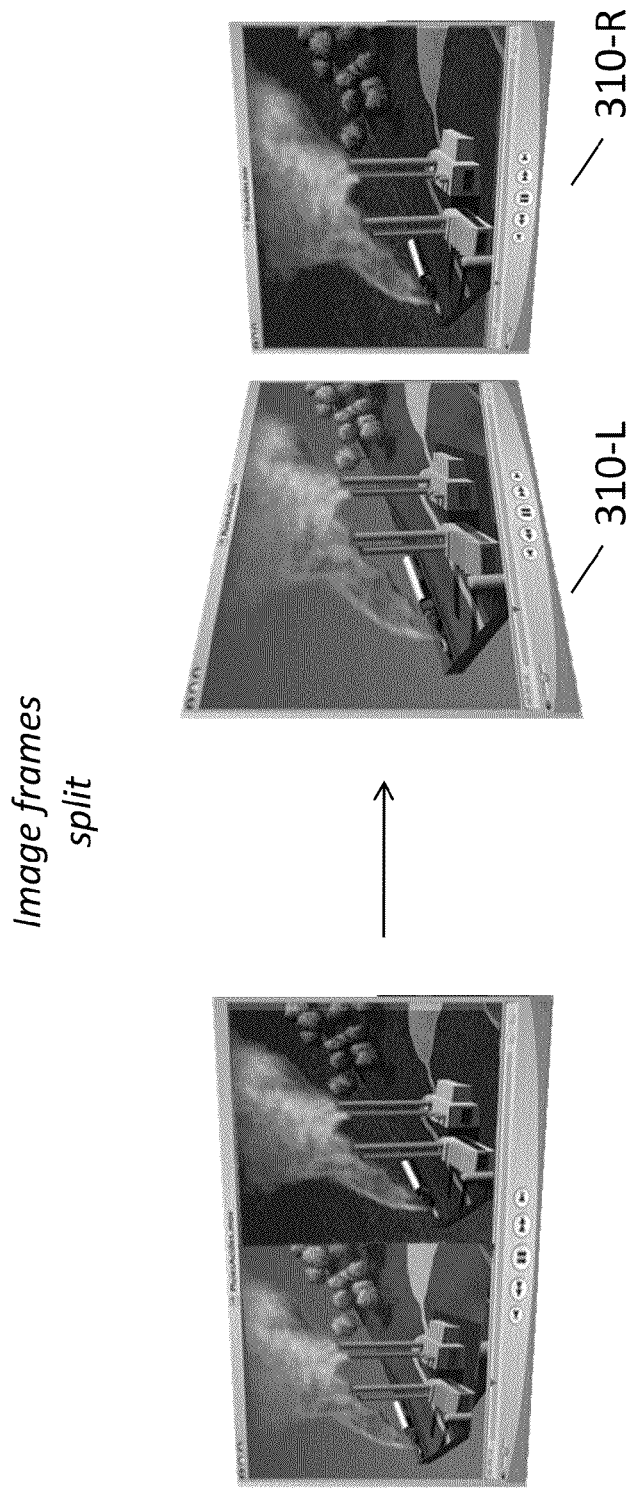
FIG. 4 is a side-by-side 3D video shown on a single screen (left and right frame shown together) in a smart phone versus splitting the images and showing on two screens, one for each eye.

However if displayed on a 3D viewing device such as the HMD 30, the left frame can be viewed exclusively by the left eye, and similarly the right frame by the right eye. The frames are filmed originally from slightly different viewing angles and hence when viewed as left and right images are able to recreate a 3D experience for the user. An example of this is shown in FIG. 4, where the HMD left display 310-L is slightly different from the HMD right display 310-R. It should be understood that the "side-by-side" video format is but one embodiment of a 3D format that can be used herein; other formats exist and are known which can make use of the approaches described herein.

Video Treatment on the HMD

Returning attention to FIG. 3, the HMD architecture typically includes video input circuits 320, video decompression 330, frame splitting 340, and two displays 310-L, 310-R, one each for the left and right eye. In the case of side-by-side video, the left hand pixels are split from the right hand pixels by the frame splitting function, to generate the two new video frames. These frames are then sent, in a synchronous fashion to the two displays. This frame splitting can be done using a combination of software and hardware features. Examples of doing so are described in the co-pending U.S. patent application Ser. No. 12/945,976 entitled "Method for Driving 3D Binocular Eyewear From Standard Video Stream, by inventor Frederick P. Herrmann, filed Nov. 15, 2010 which is hereby incorporated by reference in its entirety.

If the video signal is compressed for transport, the video input 150 to the HMD must first go through a video decompression layer where the input video is restored to full video size. After the full frame has been read in and decompressed, it can then be split into the two frames by the frame splitting function.

3D Gaming Extensions Using a Smart phone and HMD

Currently many smart phones 10 support game play in a so-called 3D mode on their single screen. Displaying 3D graphics on a small single screen creates some level of playability, but it is really only a "2.5D" experience where the player does not feel truly immersed in the scene.

However, in one embodiment herein, the 3D content generated by a smart phone 10, such as via a side-by-side approach, is displayed in true 3D on a binocular HMD 30. This provides the player a truly immersive 3D experience.

Figure 5:
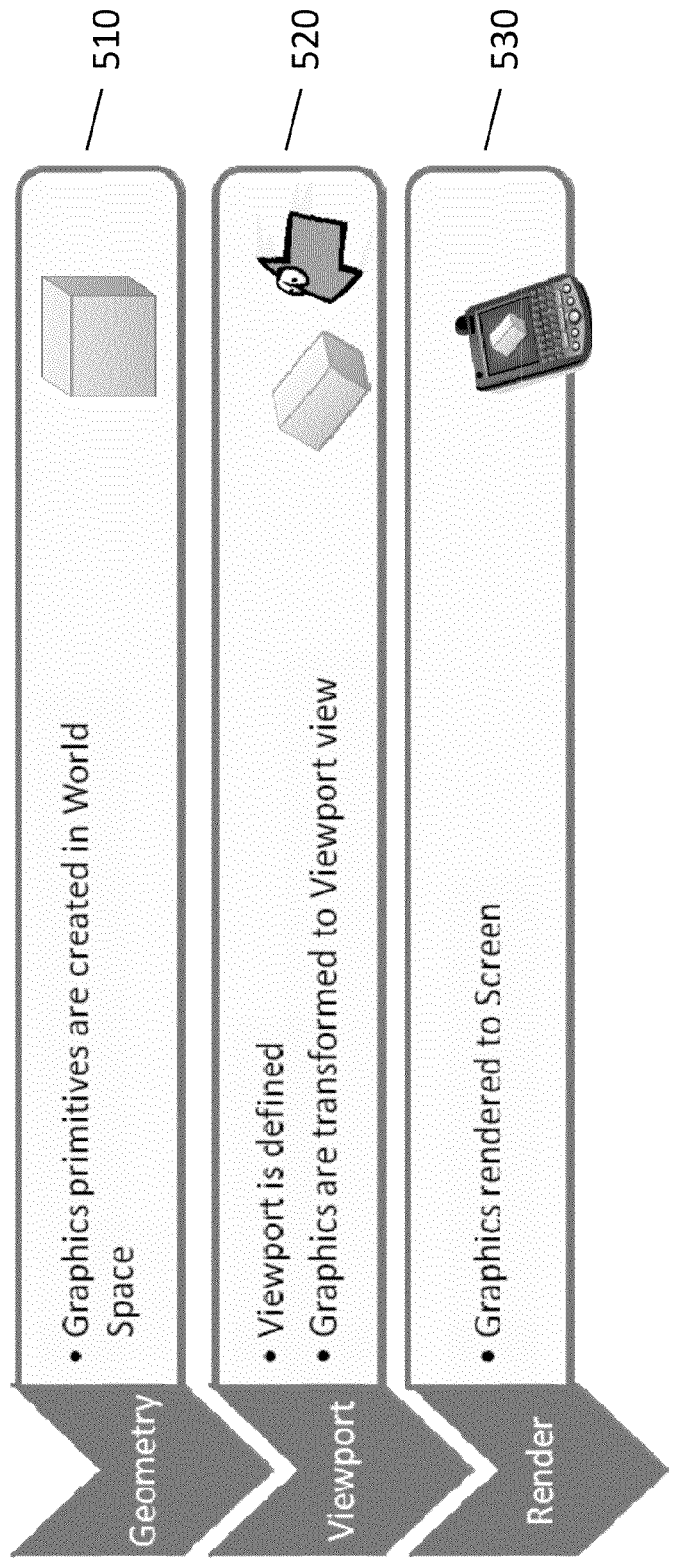
FIG. 5 is a 3D graphics pipeline for a single display.

A typical smart phone device 10 uses a 3D graphics subsystem to create its virtual world. This creation subsystem is referred to as a graphics pipeline, one example of which is shown in FIG. 5. Here graphics primitives are created 510 in a 3D world space. A viewport into the world space is defined 520, and the graphics are transformed to the viewport view. Once the transformation is made, the graphics can be rendered to a screen 530.

Figure 6:
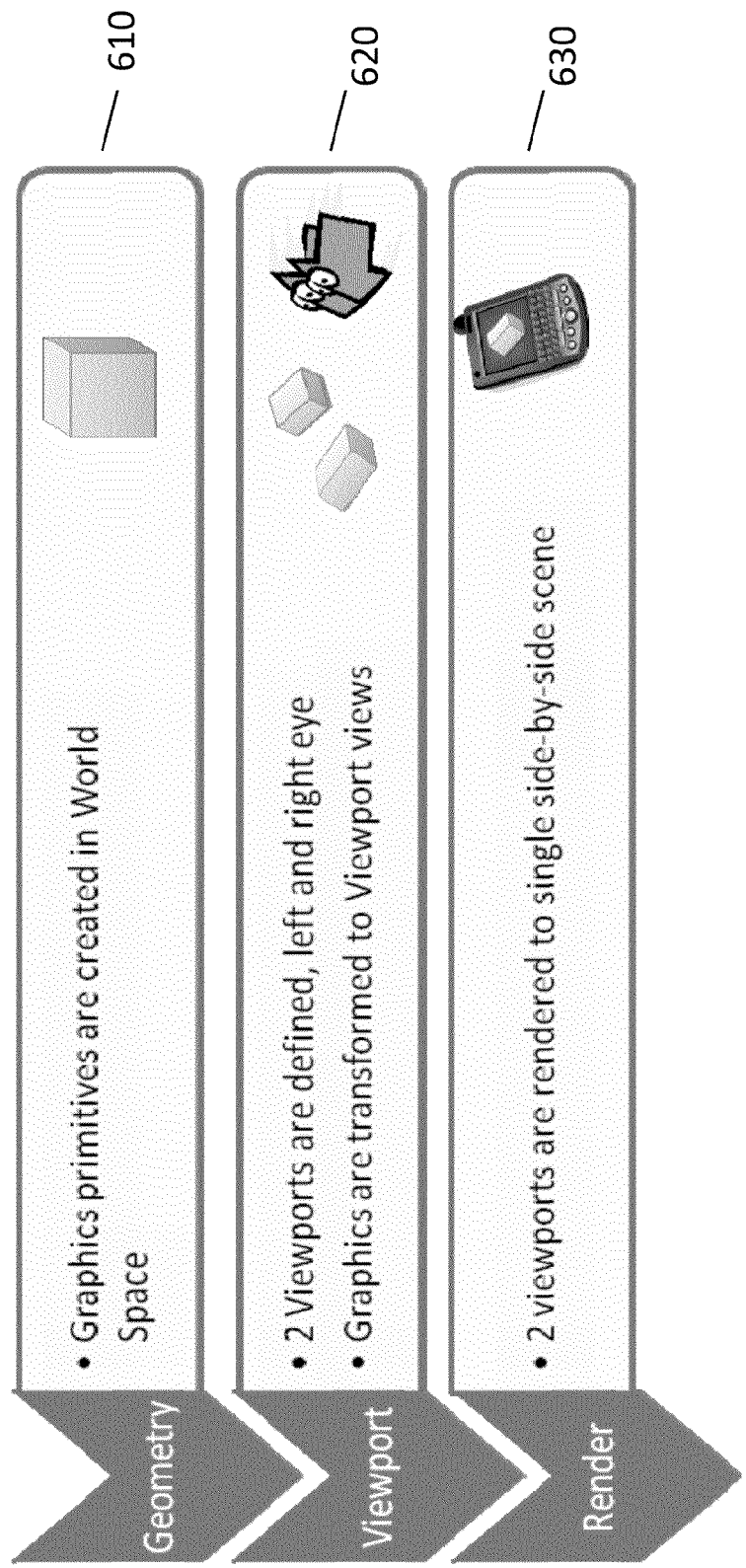
FIG. 6 is a 3D graphics pipeline for two displays.

As used in one embodiment herein, this typical graphics pipeline is modified at the software level as shown in FIG. 6. As before, graphics primitives are created in the world space 610. However, to generate a split-screen view, the pipeline 620 is comprised of two viewports, where each viewport represents the left and right eye version of the desired image. Each of the two viewports is then rendered 630 to a respective one of the left and right hand halves of the side-by-side video stream.

The dual viewport scene can then ideally be rendered directly to the High Definition (HD) video output port of the smart phone device 10, which will then feed directly into the HMD 30 as described above. The HMD 30 will treat this video input as side-by-side video and split the frames, one for left eye and one for right eye. In this way we can generate a true immersive 3D experience on a smart phone and view on a binocular HMD 30.

The same software on the smart phone device 10 can easily turn off the dual display feature and return to rendering the usual single viewport scene on the display. Hence a 3D game for such a smart phone can be directed to selectively render for either the single built-in display or a dual external (HMD) display.

In other aspects, the inputs and outputs provided by the HMD 30 can be used to augment and improve the game play experience. In one such example, HMD/eyewear 30 provides its own head tracker and/or video input capability that provides outputs indicative of relative head movement. These inputs from the HMD 30 are then used to control panning/zooming of the screen and/or the character's viewpoint. Examples of doing so are described in the co-pending U.S.

patent application Ser. No. 12/774,179 Title: "Remote Control of Host Application Using Motion and Voice Commands" by Jeffrey J. Jacobsen, et al., filed May 5, 2010 which is hereby incorporated by reference in its entirety. The connection to the HMD (and hence) feedback from the head tracker is either a wired or wireless connection such as via a WiFi or Bluetooth connection.

To improve the game play experience, in a still further embodiment, these head movement inputs are coupled with the accelerometer inputs already provided by a smart phone. In this arrangement, the accelerometer inputs, made by tilting the smart phone around, are used for indicating forward, backward and side-to-side movement of an in-game vehicle or character. Shooting, reloading or other actions (opening doors, etc.) are still performed by tapping/touching various parts of a touch sensitive surface such as the smart phone screen itself (such as on the left side, right side and center of the screen, respectively).

As one example, the signal from an accelerometer and/or a touch screen in a smart phone might only be for the control of an object in a game program, such as to steer a racing car or an airplane. The main scene for the game can now be displayed on an HMD or other video eyewear connected via a wireless interface to the smart phone. Signals from the video eyewear such as a head tracker or camera input can be provided to the smart phone and used as inputs to the game program, such as to control a viewpoint.

Figure 7:
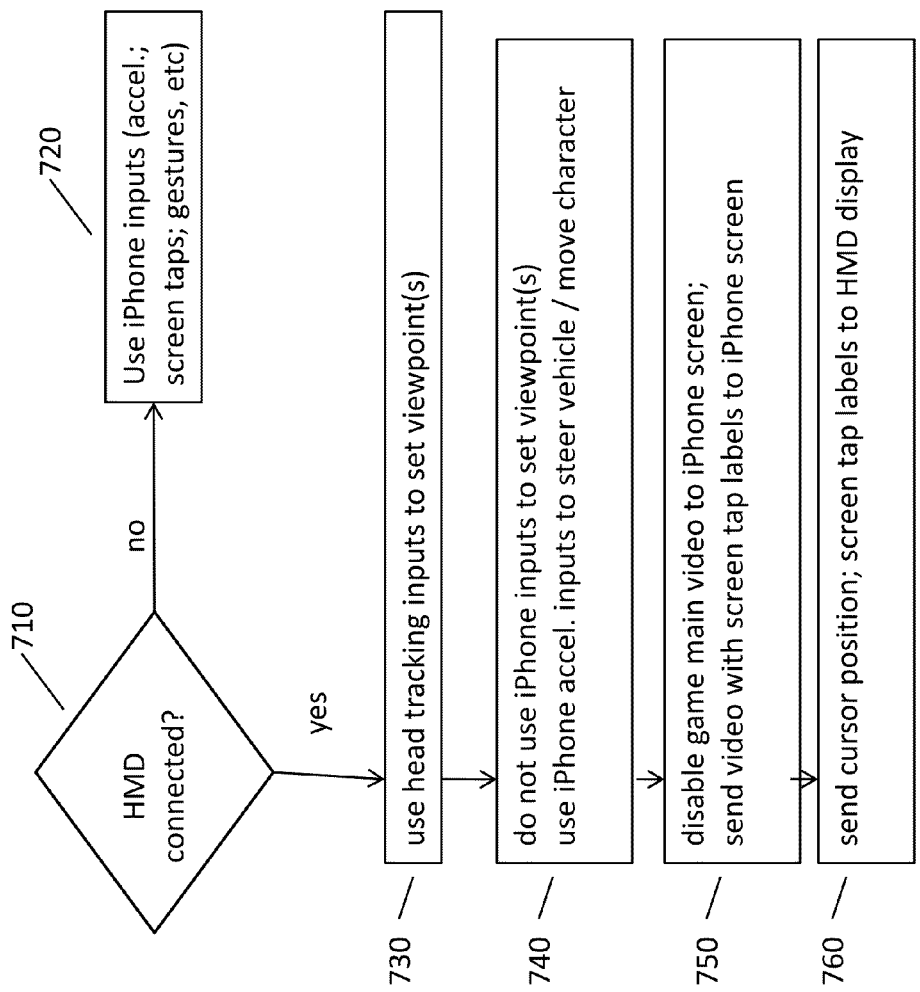
FIG. 7 is a high level flow diagram for how the smart phone may process input and outputs signals to and from the HMD.

FIG. 7 illustrates this in more detail. Here is shown a logic flow that can be incorporated into the graphics pipeline of a smart phone game app to implement selected ones of these features.

In a first state 710, a test is made to determine if an HMD is connected. If not, then game play logic proceeds as before to step 720, using only the smart phone's own built-in display and inputs (such as tap-screen and gesture inputs).

However, if an external HMD with head movement tracking is connected, then one or more modifications to game play logic can be implemented.

In a first state 730, for example, the head tracking inputs are used to set the viewpoint(s) for the pipeline. Note that given a position of the head and one eye, a viewpoint for a second eye can be derived by assuming an inter-pupillary distance. In this state, it is preferable that the smart phone accelerometer inputs are not used to set a view point, but rather only as inputs to control the position of a vehicle or in-game character.

In still other states 740 and 750, the main game video may not be sent to the smart phone screen, as it will be sent to the HMD. Thus the smart phone screen can be turned off, or can be used for other purposes, such as to display input objects such as tap-input labels, sliders, and the like.

In another state 760, the position of the user's finger on the smart phone screen may be detected and sent as for example a cursor overlaid onto the view in the HMD. This, rather than displaying on the smart phone screen, is a more natural way to provide feedback to the user as to the position of their finger.

Figure 8:
FIG. 8 is a screen shot of a "Crash Bandicoot Nitro Kart 3D"™ game.

We now discuss some example uses of these features in particular game programs. FIG. 8 shows a screen shot of "Crash Bandicoot Nitro Kart 3D"™ developed by Activision. It is the most popular paid racing application for the iPhone. FIG. 9 shows another example of the racing game for the iPhone, "Need for Speed: Undercover"™, which was developed by Electronic Arts. These games typically use the built-in accelerometer to steer the car by tilting the iPhone to the left and right. However, it is somewhat distracting to have to look at the racetrack and tilt the phone at the same time to steer, perhaps because the racetrack is fixed to the frame of the device and moves when the device moves.

An HMD 30 or other 3D video eyewear device implemented as described herein is a great application for these racing games. Displaying in real 3D make the game looks much more realistic. With the player using the HMD 30 for video playback, the racetrack course does not appear to move when the device is tilted, and the player now essentially uses the smart phone 10 as a processor and a steering wheel only, leaving the 3D viewpoint input to the HMD head tracking.

There are some simple actions that can accomplished by clicking on the screen (i.e. to use a power-up, click the bottom right icon) as programmed in the current iPhone games, but not too many screen taps are needed. One possible way to utilize the 3D eyewear inputs to the game can be to display a mouse pointer on the screen in the eyewear when the user's finger touches on the iPhone screen. This way one could see the position without having to look away from the eyewear. This is a viable solution in these racing games (as opposed to a first person shooter type game) because racing game play is much more slow-paced and there is typically no need to react quickly.

Figure 10:
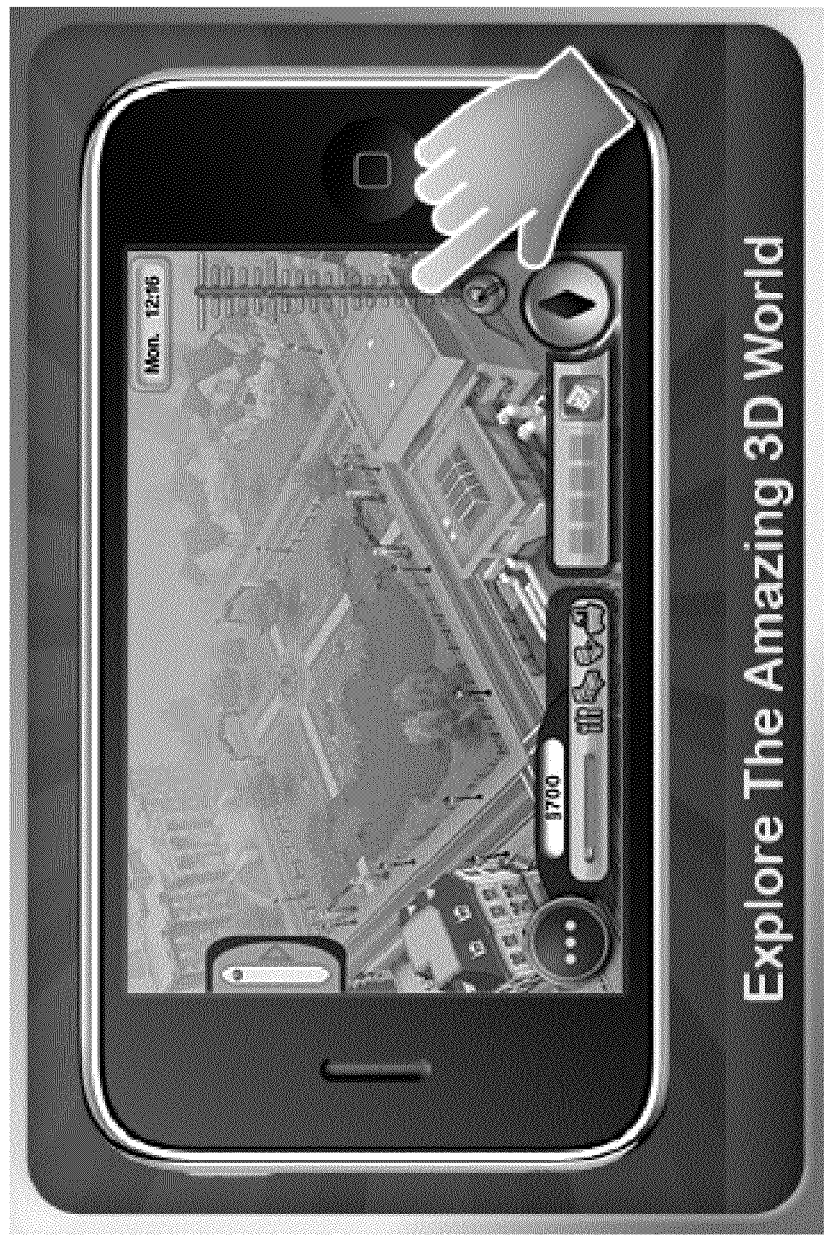
FIG. 10 is a screen shot of a "Sims"™ game.

The "Sims"™ franchise, by Maxis, as shown in FIG. 10 has been successful in the PC game world for a long time and this application is also quite popular for the iPhone. Because the Sims world has a 3D feel to it, 3D eyewear can be very well suited for more realistic game play.

In the current iPhone Sims game, quite a bit of interaction is required by clicking things on the screen to accomplish certain actions. As in the racing game, a better solution is to display a mouse pointer on the screen of the eyewear when the user's finger touches on the iPhone screen. In this game, the head tracking input can also be used to provide a more natural game experience.

Figure 11:
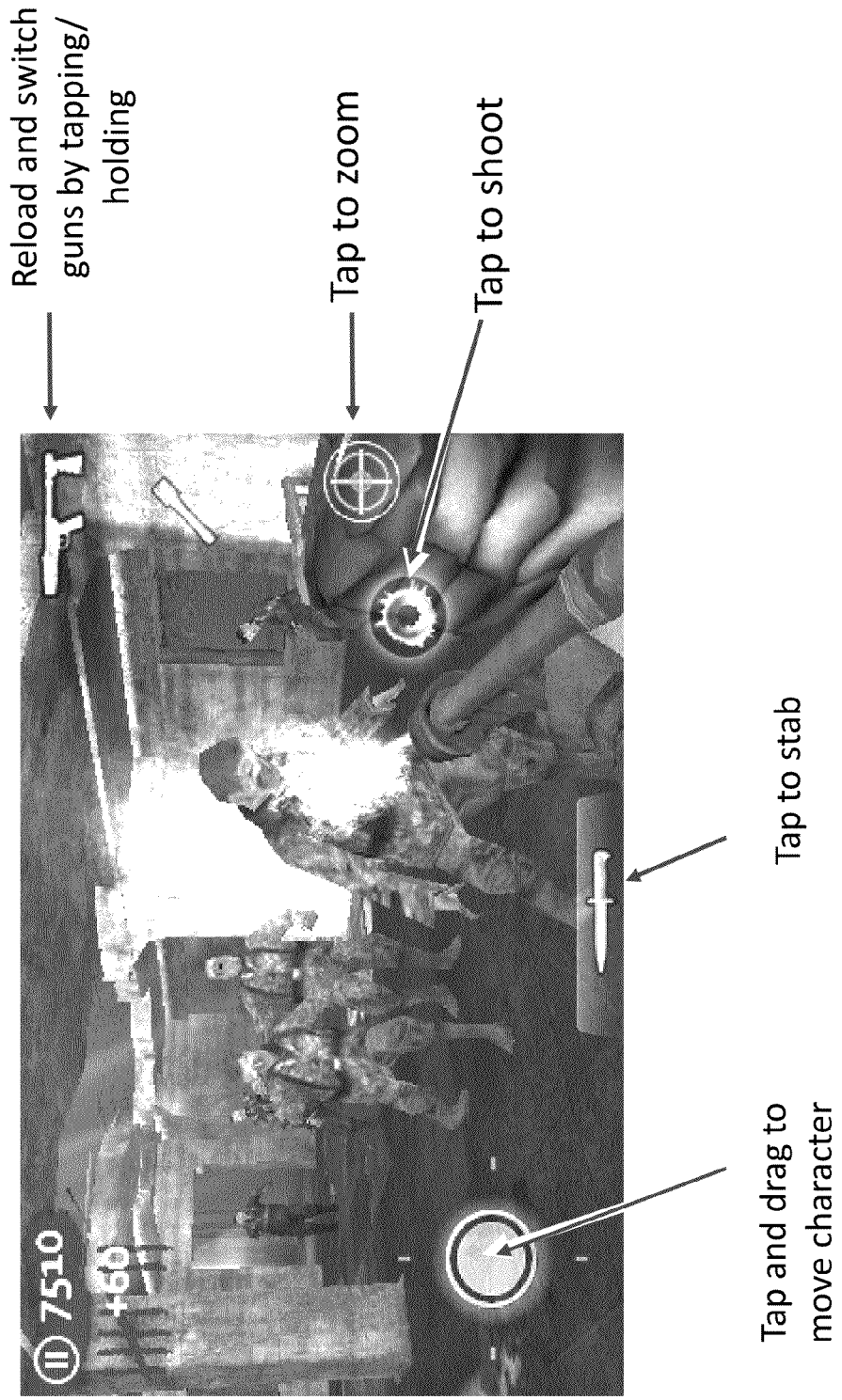
FIG. 11 is a screen shot of a "Call of Duty"™ game.

"Call of Duty: World at War: Zombies"™, also developed by Activision is a top grossing iPhone game application. FIG. 11 shows an example screen shot for this game. One can see many different targets on the screen. One has to touch and drag certain parts of the screen to move and other areas to pan the screen around. There are certain spots to tap to shoot, to reload, etc. The game is fun, but it definitely takes some getting used to in order to play well. By default, the accelerometer is not used. However, it can be enabled by going into the options to pan the screen, which takes one "touch" element away.

Unlike a PC which has a mouse and keyboard or the PS3 which has 10 buttons, 2 joystick wheels and a directional pad, the iPhone alone has no controls other than the screen itself. The HDM head tracking feature would facilitate the control aspect of the game by removing some interaction with the smart phone, which is especially important in the First Person Shooter (FPS) genre such as this game.

As it stands, this (and probably any other) smart phone FPS game is much harder to play without the eyewear. With the eyewear, the head tracking inputs can be used to set the viewpoints (rather than a screen tap) other It can now be understood how a video game can thus take advantage of the processing power of both an HMD 30 and a smart phone 10. Any input from the HMD 30, such as head tracking, can be processed before sending it to the smart phone 10 or vice versa.

The teachings of all patents, published applications and references cited herein are incorporated by reference in their entirety.

While this invention has been particularly shown and described above with references to example embodiments thereof, it will be understood by those skilled in the art that various changes in form and details may be made therein without departing from the scope of the invention encompassed by the appended claims. And while the preferred embodiment(s) of the present invention(s) are now shown and described, it is envisioned that those skilled in the art may devise various modifications without departing from the spirit and scope of the appended claims, and it is therefore only the claims that define the legal scope of this invention.

What is claimed is:

1. A method for operating a smart phone comprising:
coupling communicatively the smart phone to a video eyewear device via a wired or wireless interface, the smart phone being in a hand-held configuration, and the video eyewear device being in a head-worn configuration;
accepting user input signals from an accelerometer and a touch screen in the smart phone, the user input signals indicating control over movement of an object in a graphical world space defined in an application program executing on the smart phone;
deriving video data signals indicating a main scene for the world space;
forwarding the video data signals over the interface for display only on a display of the video eyewear;
accepting input signals from the video eyewear device indicative of head movement; and
using, in the smart phone, the input head movement signals as other input data to control certain logic of the application program, including to control user viewpoint of the graphical world space separate from reality, while the user input signals from the accelerometer and/or touch screen in the smart phone control movement of the object in the graphical world space.

2. The method of claim 1 wherein the video eyewear is a Head Mounted Display.

3. The method of claim 1 wherein the video signals are further processed by the video eyewear device to provide three dimensional (3D) video processing.

4. The method of claim 1 wherein the graphical world space is used to implement a game program.

5. The method of claim 1 additionally comprising:
accepting additional input from a touch screen, and
providing the touch screen input to the eyewear to indicate a cursor location in the main scene.

6. A smart phone apparatus comprising:
a processor for executing an application program;
input devices, including a accelerometer and a touch screen, for providing user input signals, generated by the accelerometer and the touch screen, to the application program to indicate control over movement of an object in a graphical world space defined in the application program;
an interface to a video eyewear device, the interface for providing a video data signal indicating a main scene for the graphical world space, and for accepting input head movement signals from the video eyewear device indicative of user head movement; and
wherein that input head movement signals are also provided to the processor of the smart phone as other input data to control certain logic of the application program, including to control user viewpoint of the graphical world space separate from reality while the user input signals provided by the input devices, including the accelerometer and the touch screen, control movement of the object in the graphical world.

7. The apparatus of claim 6 wherein the video eyewear device is a Head Mounted Display.

8. The apparatus of claim 7 wherein the video signals are further processed by the video eyewear device to provide three dimensional (3D) video processing.

9. The apparatus of claim 6 wherein the application program implements a game.

10. The apparatus of claim 7 wherein the touch screen further provides the touch input to the eyewear device as indicating a cursor location in the main scene.

11. The apparatus of claim 6 wherein the interface between the smart phone and the eyewear device is a wired or a wireless interface.

* * * * *